United States Patent [19]

Fukata

[11] 3,761,819

[45] Sept. 25, 1973

[54] BROADCAST SYSTEM FOR A CONTROL SIGNAL UNDER PROTECTION AGAINST SPURIOUR TRIGGERING

[76] Inventor: Masao Fukata, 2-10-14, Shimorenjaku, Mitaka-shi, Tokyo, Japan

[22] Filed: Dec. 28, 1971

[21] Appl. No.: 212,926

[30] Foreign Application Priority Data

Dec. 28, 1970 Japan .............................. 45/126331

[52] U.S. Cl. ........................ 325/64, 325/65, 325/55, 343/228

[51] Int. Cl. ............................................ H04b 1/00

[58] Field of Search .......................... 325/64, 65, 55; 179/84 VF; 343/225, 226, 227, 228; 340/163

[56] References Cited

UNITED STATES PATENTS 3,566,270 2/1971 Fukata ............................... 343/227

2,978,676 4/1961 Spencer ................................ 325/64

*Primary Examiner*—Robert L. Griffin

*Assistant Examiner*—William T. Ellis

*Attorney*—Robert M. Dunning

[57] ABSTRACT

A broadcast system for a control signal under protection against spurious triggering caused by a false signal which is similar to the control signal. A monitoring device is provided at an appropriate position in the service area of the broadcast system for detecting the false signal before spurious triggering of the receiving side of the broadcast system caused by the false signal. The monitoring device transmits a false indication signal to the sending side in response to the false signal. The sending side transmits a spurious trigger protection signal in response to the false indication signal, only when the control signal is not being transmitted, for checking erroneous detection of the false signal by the receiving side. The signal configuration of the spurious trigger protection signal may be determined so that erroneous detection of the false signal by the receiving side is automatically eliminated. A spurious trigger protection signal detector may be further provided at the receiving side for performing the above checking function.

9 Claims, 28 Drawing Figures

Fig. 2

INVENTOR.
Masao Fukata
BY
ATTY.

INVENTOR.
Masao Fukata
BY
Robert M. Dunning
ATTY.

INVENTOR.
Masao Fukata
BY
Robert M. Dunning
ATTY.

INVENTOR.
Masao Fukata
BY
Robert M. Dunning
ATTY.

INVENTOR.
Masao Fukata
BY
Robert m. Dunning
ATTY.

INVENTOR.
Masao Fukata
BY
Robert M. Dunning
ATTY.

INVENTOR.
Masao Fukata
BY
Robert M. Dunning
ATTY.

INVENTOR.
Masao Fukata
BY
Robert M. Dunning
ATTY.

INVENTOR.
Masao Fukata
BY
Robert m. Dunning
ATTY.

BROADCAST SYSTEM FOR A CONTROL SIGNAL UNDER PROTECTION AGAINST SPURIOUR TRIGGERING

This invention relates to broadcast systems for control signals and, more particularly, to a broadcast system for a control signal under protection against spurious triggering due to a false signal which is similar to the control signal.

In a broadcast system of the type, such as an emergency broadcast system, a control signal is transmitted before sending out of emergency information for switching receiving sets to the unmuted state. In this case, it is essential that in consideration of the nature of the emergency information, the emergency information to be transmitted is reliably transmitted to each of the receivers in 100 percent efficiency and, in a case of no transmission of the emergency control signal, a detection circuit for detecting the control signal does not at all carry out the spurious triggering in which it detects in error a false signal similar to the control signal as the regular emergency control signal. Accordingly, the broadcast system of the type has usually protection functions against spurious triggering. In one of such conventional systems (e.g.; Japanese Patent No. 583906), a narrow band elimination filter having a center frequency equal to the frequency component of the control signal is inserted in a program signal path of the broadcast station when a false signal detector detects "a condition immediately preceding to the spurious triggering" for the receiving sets. As a result of such insertion of the narrow band elimination filter, spurious triggering caused by the program signal from its broadcast station can be effectively eliminated. However, a false signal not caused by the broadcast station (e.g.; interference or noise) is received by a receiver of the above-mentioned conventional system, the receiver will be affected by spurious triggering since such conventional system has not protection functions against spurious triggering caused by a false signal which is not included in the program signal from the broadcast station.

An object of this invention is to provide a broadcast system for a control signal under protection against spurious triggering caused by a false signal irrespectively of whether or not the false signal is included in a program signal of the broadcast system.

The principle, construction and operations of the system of this invention will be understood from the following detailed discussion taken in conjunction with the accompanying drawings, in which.

Figure 1A:
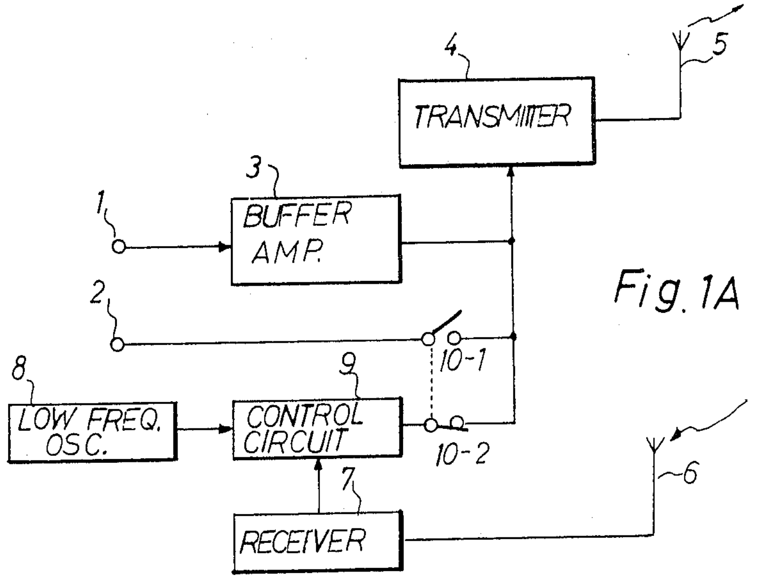
FIG. 1A is a block diagram illustrating an example of the sending side of the system of this invention.
Figure 1B:
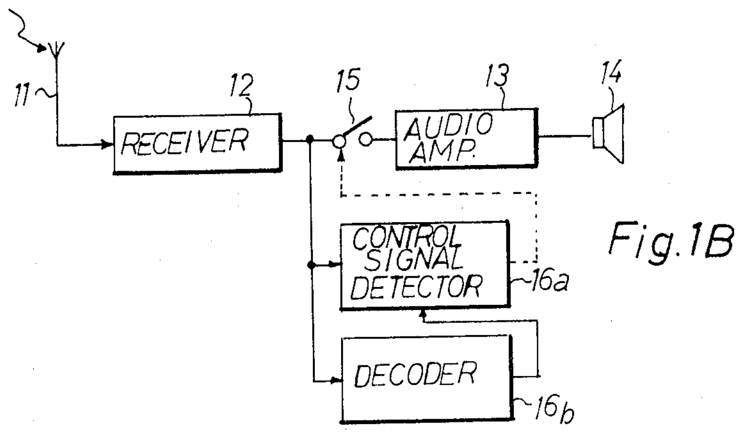
FIG. 1B is a block diagram illustrating an example of the receiving side of the system of this invention.
Figure 1C:
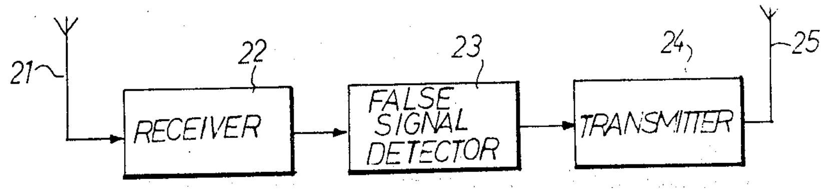
FIG. 1C is a block diagram illustrating an example of a monitoring device employed in the system of this invention.

With reference to FIGS. 1A, 1B and 1C, the principle of this invention will first be described.

With reference to FIG. 1A, an example of the sending side of the system of this invention comprises an input terminal 1 for applying thereto a program signal, a control terminal 2 for applying thereto a control signal to be transmitted to the receiving side, a buffer amplifier 3 for amplifying the program signal applied from the input terminal 1, a transmitter 4 including a modulator for transmitting the program signal and the control signal, an antenna 5 coupled to the transmitter 4. The sending side further comprises, for sending out a spurious trigger protection signal, a receiving antenna 6, a receiver 7 for receiving a false indication signal transmitted from a monitoring device shown in FIG. 1C as described below, a low frequency oscillator 8 for generating at least one low frequency sinusoidal wave, a control circuit 9 for producing the spurious trigger protection signal by the use of the low frequency sinusoidal wave in response to the false indication signal received by the receiver 7, and switches 10–1 and 10–2 commonly controlled. The switch 10–1 is closed only at an emergency control time when the control signal from the terminal 2 is send out from the transmitter 4, while the switch 10–2 is opened only at the emergency control signal.

With reference to FIG. 1B, an example of the receiving side of the system of this invention comprises a receiving antenna 11, a receiver 12 including at least one high frequency stage, at least one intermediate frequency stage and a demodulator, a control signal detector 16*a* for detecting the control signal transmitted from the sending side, a switch 15 closed in response to an output of the control signal detector 16*a* only when the detector 16*a* detects the control signal, an audio amplifier 13 for amplifying an audio signal (i.e.; emergency information) demodulated in the receiver 12, and a speaker 14 connected to the output of the audio amplifier 13. If necessary, the receiving side further comprises a decoder 16*b* which detects the spurious trigger protection signal transmitted from the sending side and temporarily checkes detection operation in the control signal detector 16*a*. If the detection operation of the control signal detector 16*a* is automatically checked by the spurious trigger protection signal, the decoder 16*b* is unnecessary.

With reference to FIG. 1C, a monitoring device employed in the system of this invention comprises a receiving antenna 21, a receiver 22 for monitoring a frequency band of the control signal, a false signal detector 23 for detecting from an output of the receiver 22 a false signal similar to the control signal as "a condition immediately preceding to the spurious triggering" for the receiving side, a transmitter 24 for sending the false indication signal to the sending side when the false signal detector 23 detects such a false signal, and a transmitting antenna 25. This monitoring device is usually provided near the receiving side for covering a number of receiving sets.

Accordingly, if the false signal detector 23 detects a false signal, the false indication signal is transmitted from the transmitter 24 to the receiver 7. The control circuit 9 generates a spurious trigger protection signal in response to the false indication signal, so that the spurious trigger protection signal is transmitted from the transmitter 4 to the receiver 12. The spurious trigger protection signal checks, automatically or by use of the output of the decoder 16*b*, an erroneous detection operation at the control signal detector 16*a*. This is the principle of this invention.

As understood from the above principle, the false indication signal may be interpreted as an inquiry about whether or not the sending side is now transmitting a control signal. In this case, if a normal control signal is now transmitted, the switch 10–2 is opened while the switch 10–1 is closed. Accordingly, the spurious trigger protection signal is not transmitted from the control circuit 9 to the decoder 16*b*, so that the control signal detector 16*a* will correctly detect the normal control signal. However, if no control signal is transmitted, the switch 10–1 is opened while the switch 10–2 is closed as shown in FIG. 1A. Accordingly, the spurious trigger protection signal is transmitted from the control circuit 9 to the receiving side as "information representative of non-transmitting a control signal". The spurious trigger protection signal checks an erroneous detection operation at the control signal detector 16*a*.

Figure 2:
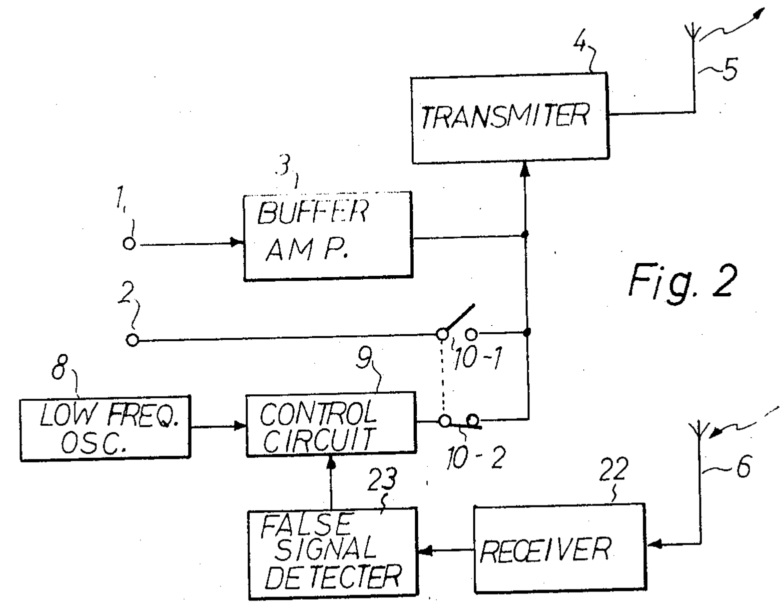
FIG. 2 is a block diagram illustrating an example of the sending side of the system of this invention having the monitoring device.

The monitoring device shown in FIG. 1C is provided at a place where the above mentioned false signal frequently occurs. A plurality of monitoring devices may be provided for a single sending side shown in FIG. 1A. Moreover, the monitoring device may be assiciated with the sending side as shown in FIG. 2, in which the output of the false signal detector 23 is directly coupled with the control circuit 9.

The characteristics of the false signal detector 23 are designed so as to have a fail-safe function. In other words, the false signal detector 23 has higher sensitivity and broader selective frequency-band in comparison with those of the control signal detector 16*a*.

The false indication signal may be transmitted from the monitoring device to the sending side through other transmission medium, such as a cable transmission medium, in addition to the above wireless system.

Figures 3A, 3B, 3C, 3D, 3E:
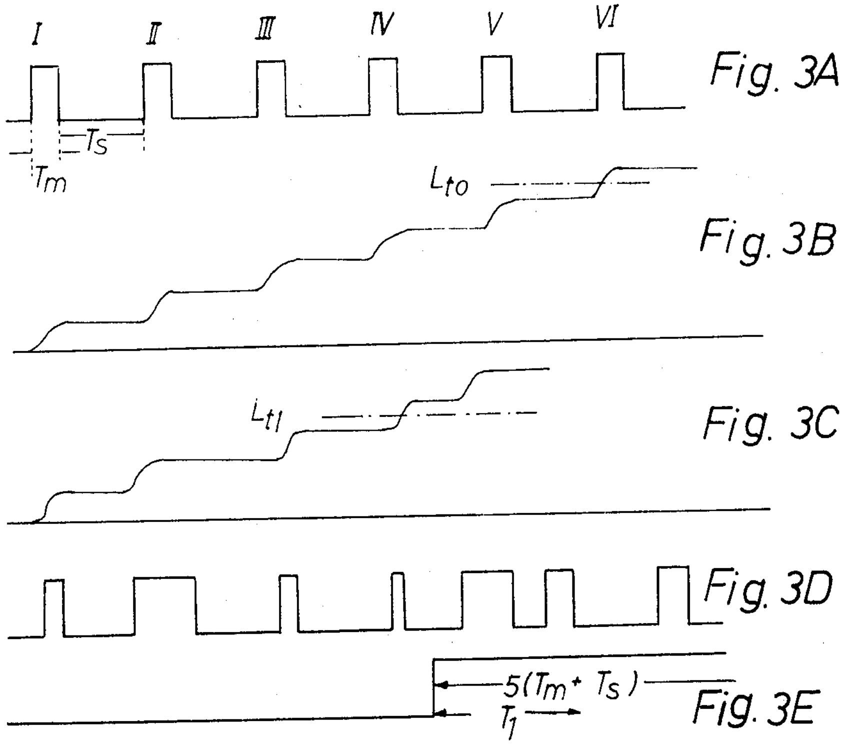
FIGS. 3A to 3E are time charts explanatory of operations of an example of the system of this invention.
Figure 4:
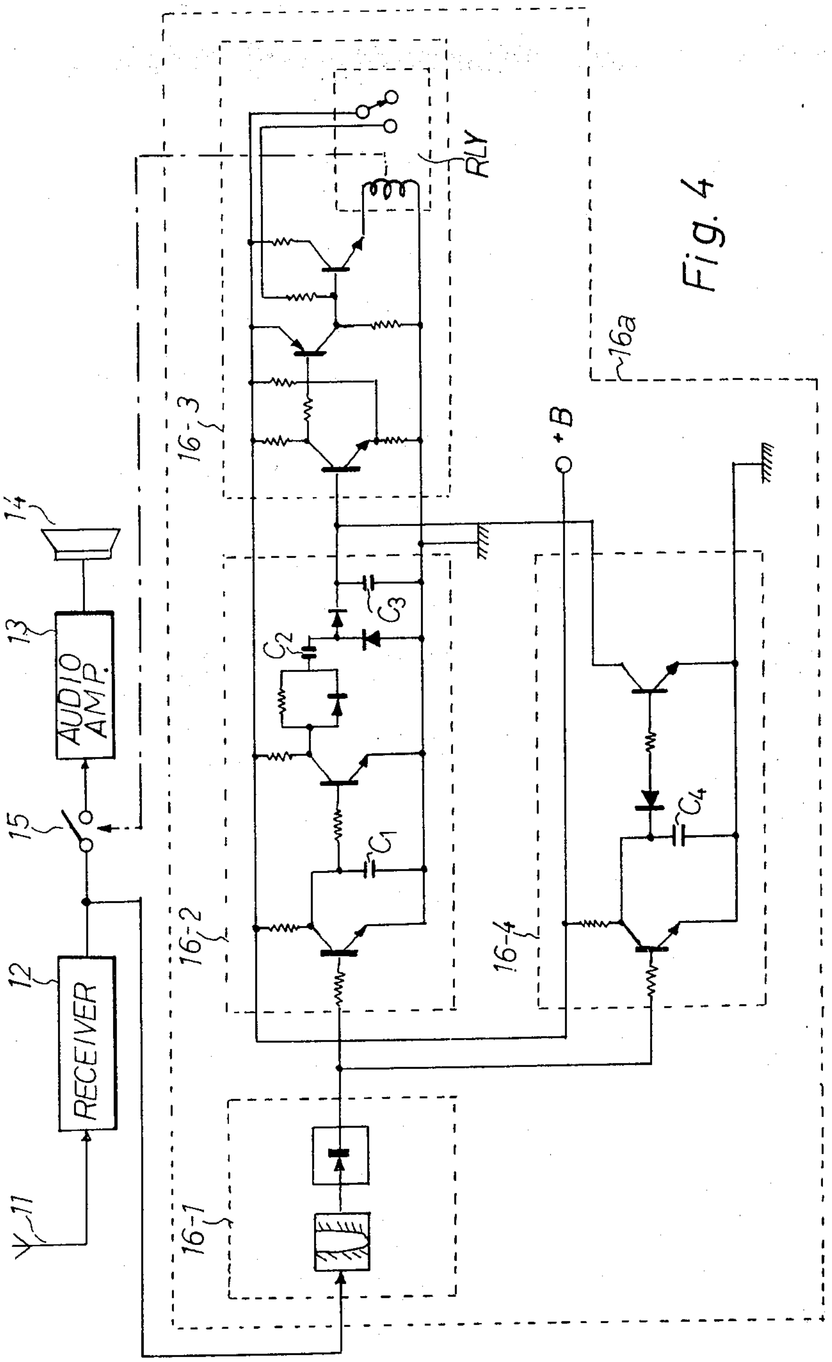
FIG. 4 is a connection diagram including a block diagram illustrating an example of the receiving side of the system of this invention suitable for a signal configuration described with reference to FIGS. 3A to 3E.

Detailed constructions of the system of this invention are determined so as to be suitable for signal configuration of the control signal. Accordingly, details of this invention will be described below in separate items (i), (ii), (iii) and (iv) respectively.

i. First type suitable for a control signal of keying signal configuration:

In this case, it is assumed that a control signal is six mark pulses I, II, III, IV, V and VI each having a duration Tm and having regular spaces Ts as shown in FIG. 3A. FIG. 4 shows an example of the receiving side suitable for the signal configuration of the control signal shown in FIG. 3A. A control signal detector 16*a* comprises a selecting-rectifier 16–1 for selecting frequency components of the control signal and for producing a dc voltage by rectifying the selected output, a counting circuit 16–2 for counting the number of pulses in the dc output of the selecting-rectifier 16–1, a relay circuit 16–3 for switching-ON the switch 15 when the counting circuit 16–2 counts a predetermined number (e.g.; "six" for the signal configuration shown in FIG. 3A) of pulses, and a resetting circuit 16–4 for resetting a counting state of the counting circuit 16–2 to the zero state in response to a continuous space signal lasting more than a predetermined duration $T_1$. On the other hand, the false signal detector 23 of the monitoring device comprises the selecting-rectifying circuit 16–1, the counting circuit 16–2, and a signal generator for generating the false indication signal in response to the output of the counting circuit 16–2. In this case, the counting circuit 16–2 provided in the false signal detector 23 is designed so that an output is produced when a smaller number (e.g.; "four" for signal configuration shown in FIG. 3A) of pulses than the predetermined number six are counted. The time length $T_1$ of the continuous signal is determined so as to be equal to an integer-multiple (e.g.; more than five) of a unit time length ($Tm + Ts$) as shown in FIG. 3E. Accordingly, the threshold level of the relay circuit 16–3 is equivalently a level $L_{to}$ shown in FIG. 3B while the threshold level of the false signal detector 23 is equivalently a level $L_{tt}$ shown in FIG. 3C.

Figures 5A, 5B, 5C, 5D:
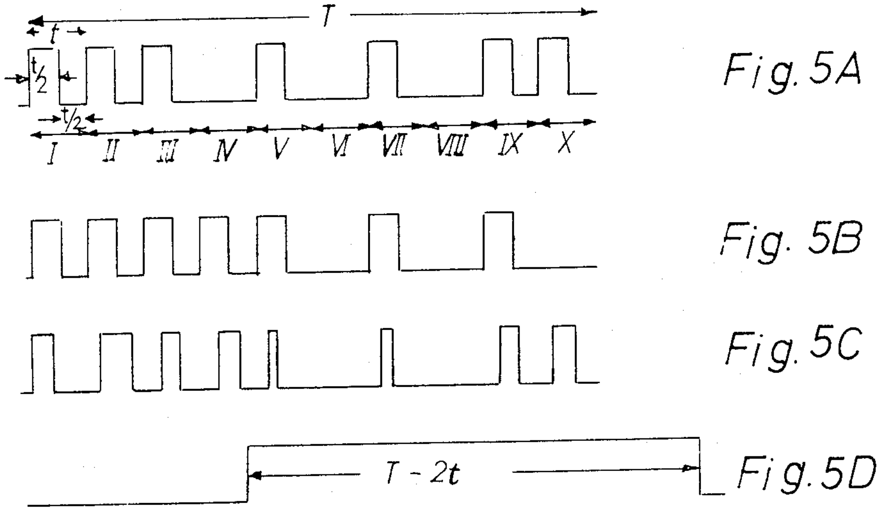
FIGS. 5A to 5D are time charts explanatory of operations of another example of the system of this invention.

If a normal control signal is transmitted from the sending side, this control signal is detected by a control signal detector 16 since the spurious trigger protection signal shown in FIG. 3E is not at all transmitted from the sending side in accordance with the open state of the switch 10–2. However, if a false signal shown in FIG. 3D is received by the monitoring device, a false indication signal is then applied to the control circuit 9 in response to a time when a charged voltage in a capacitor $C_3$ of the counting circuit 16–2 of the false signal detector 23 reaches the threshold level $L_{tt}$. The spurious trigger protection signal shown in FIG. 3E is transmitted from the sending side to the receiving side in response to the false indication signal from the false signal detector 23. Accordingly, since the number of pulses counted by the counting circuit 16–2 is always less than five, erronious detection in the counting circuit 16–2 is available. When the duration of the spurious trigger protection signal exceeds a time $T_1$ shown in FIG. 3E mentioned above, the charged voltage in a capacitor $C_3$ of the counting circuit 16–2 of the receiving side is discharged. Therefore, an erroneous triggering is automatically eliminated.

ii. Second type suitable for a control signal of coded signal configuration:

In this case, it is assumed that a control signal is formed by ten elements I to X, as shown in FIG. 5A, each having a preceding half period and a succeeding half period. The preceding half period has possible two states 1 and 0, while the succeeding half period has always a state 0. Accordingly, the coded signal shown in FIG. 5A indicates a binary number 1110101011. In this case, a plurality of different control signals may be employed for controlling different service zones respectively. In the following, it is assumed that the control signal is a coded signal 1111101010 as shown in FIG. 5B, and that the spurious trigger protection signal is a continuous mark signal, as shown in FIG. 5D, having a substantial duration $(T - 2t)$, where T is a signal length of the control signal and $t$ is a time length of the signal element of the control signal.

Figure 6:
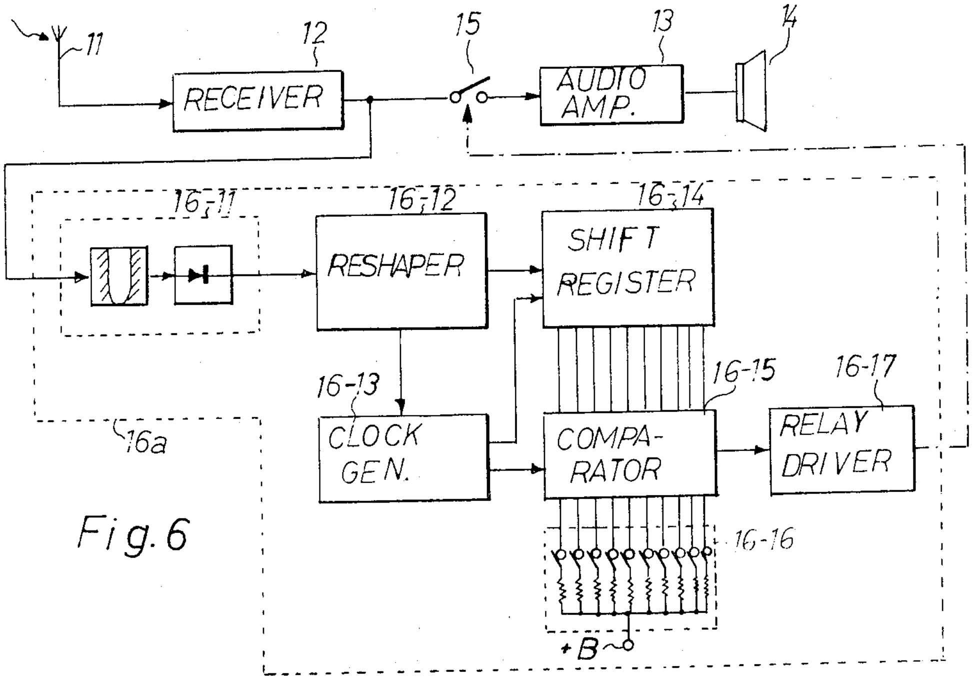
FIG. 6 is a block diagram illustrating an example of the receiving side of the system of this invention suitable for a signal configuration described with reference to FIGS. 5A to 5D.

FIG. 6 shows an example of the receiving side suitable for the signal configuration of the control signal shown in FIG. 5B. A control signal detector **16*a* comprises a selecting-rectifier 16–11 for selecting frequency components of the control signal and for producing a dc signal, such as the coded signal shown in FIG. 5A or 5B, a reshaper 16–12 for reshaping the output dc voltage of the selecting-rectifier 16–11, a clock generator 16–13 for generating clock pulses in synchronism with the reshaped signal, a shift register 16–14 for shifting signal elements of the reshaped signal, a preset circuit 16–16 for presetting a coded adress corresponding to the control signal 1111101010, a comparator 16–15 for producing a coincidence signal if ten output states of the shift register 16–14 coincides with present states applied from the preset circuit 16–16, and a relay circuit 16–17 for switching-ON the switch 15 in response to the coincidence signal applied from the comparator 16–15.**

Figures 7A, 7B, 7C, 7D:
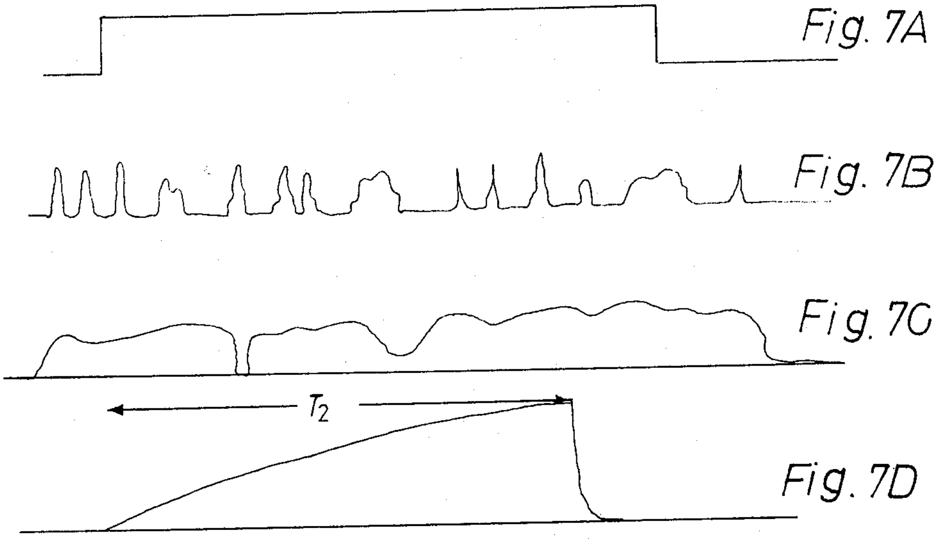
FIGS. 7A, 7B, 7C and 7D are time charts explanatory of operations of another example of the system of this invention.
Figure 8:
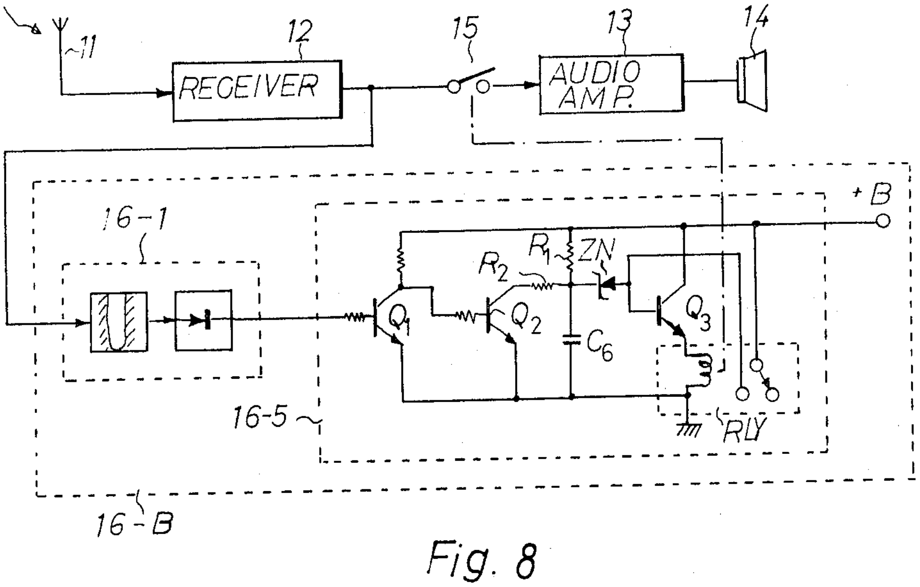
FIGS. 8 and 9 are circuit diagrams illustrating examples of the receiving side of the system of this invention each suitable for a signal configuration described with reference to FIGS. 7A to 7D.

As a result of the above construction, the switch 15 is switched-ON in response to a normal control signal, since the spurious trigger protection signal is not at all transmitted from the sending side in this case due to the opened state of the switch 10–2. However, if a false signal shown in FIG. 5C is received by the monitoring device, the false signal detector 23 produces the false indication signal in response to successive four pulses, so that the spurious trigger protection signal shown in FIG. 5D is transmitted from the control circuit 9 and the transmitter 4 to the receiving side. In response to the spurious trigger protection signal, the dc output of the reshaper 16–12 continuously assumes the state 1 during the duration $(T-2t)$ after the successive four pulses of the false signal shown in FIG. 5C. In other words, the state of the false signal is changed to the state 1 during the duration $(T-2t)$ after the successive four pulses in response to the spurious trigger protection signal shown in FIG. 5D. Accordingly, erroneous detection at the control signal detector **16*a*** can be automatically avoided in response to the spurious trigger protection signal. As understood from the above principle, the state of the control signal of this case is determined except an all mark 1111111111.

iii. Third type suitable for a control signal of continuous signal configuration:

In this case, it is assumed that a control signal is a continuous signal lasting a duration $T_1$ as shown in FIG. 7A. For receiving the control signal of this type, an example of conventional receiving devices is shown in FIG. 8. In this example, a control signal detector 17–B comprises a selecting-rectifier 16–1 and a measuring circuit 16–5 for measuring the duration of a continuous mark signal obtained from the selecting-rectifier 16–1. In the circuit 16–5, a capacitor $C_6$ is charged if the mark signal continues, since a transistor $Q_1$ is conductive while a transistor $Q_2$ is cut-off in this case. However, if the output of the selecting-rectifier 16-1 is forcibly cut-off as shown in FIG. 7B or FIG. 7C, the transistor $Q_1$ is cut-off while the transistor $Q_2$ becomes conductive. Accordingly, the charged voltage in the capacitor $C_6$ is immediately discharged in response to cut-off of the output voltage of the selecting-rectifier 16–1. If the continuous mark signal obtained at the output of the selecting-rectifier 16–1 continues a duration $T_2$ substantially equal to the duration $T_1$, a zener diode ZN becomes conductive so that the relay RLY switches the switch 15 in response to transferring a transistor $Q_3$ to the conductive state.

In order to avoid spurious triggering in the example shown in FIG. 8, a spurious trigger protection signal for forcibly cutting off the output voltage of the selecting-rectifier 16–1 is transmitted from the sending side to the receiving side in response to the false indication signal from the monitoring device. For this purpose, high power transmission of a spurious trigger protection signal having an opposite sense to the false signal is necessary. Accordingly, this is unsuitable for practical usages.

Figure 9:
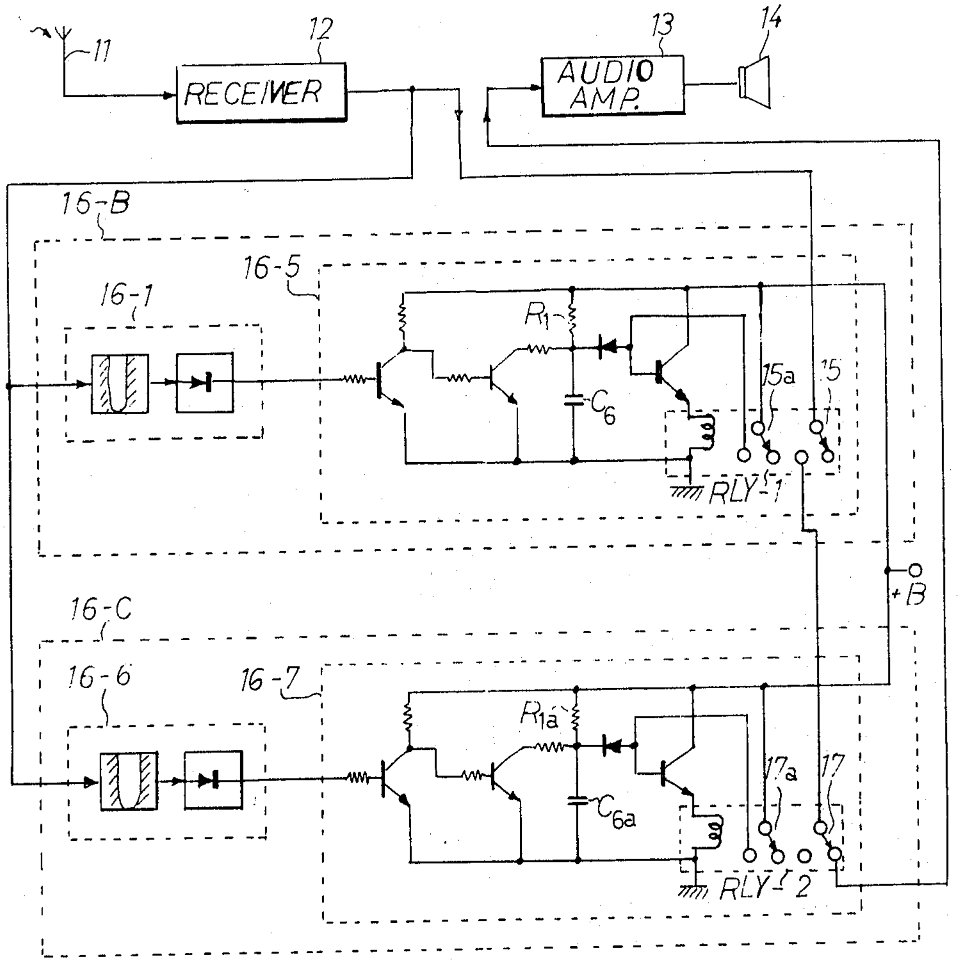
Figures 10, 11A, 11B, 11C:
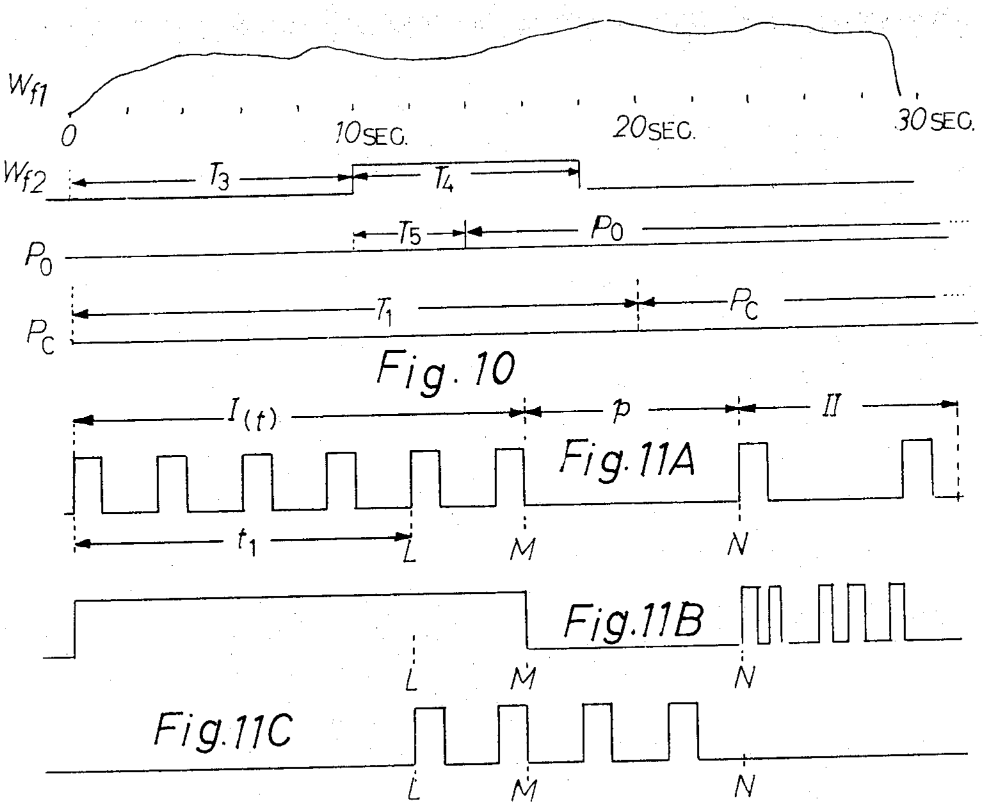
FIG. 10 shows time charts explanatory of operations of the example shown in FIG. 9.
FIGS. 11A, 11B and 11C are time charts explanatory of operations of another example of the system of this invention.

For overcoming the above mentioned difficulty, an example of the receiving side shown in FIG. 9 may be employed, while a spurious trigger protection signal having a duration $T_4$ and a frequency $f_2$ which is different from the frequency $f_1$ of the continuous control signal is employed as shown in FIG. 10. In this example, a control detector 16–B and a spurious trigger protection signal detector 16–C are provided for detecting the continuous control signal and the spurious trigger protection signal respectively. Selecting-rectifiers 16–1 and 16–6 are designed so as to suit for the frequency $f_1$ and the frequency $f_2$ respectively. Time constants of detection circuits 16–5 and 16–7 are determined so as to suit for the duration $T_1$ of the continuous control signal and a duration $T_5$ less than a duration $T_1$–$T_3$ respectively, where $T_3$ is a time constant of the false signal detector 23. The output of the receiver 12 is applied to the audio amplifier 13 through the switch 15 and a switch 17. The switch 15 is switched-ON when the control signal detector 16–B detects a continuous duration (T) of a signal of frequency $f_1$. On the other hand, the switch 17 is switched-OFF when the spurious trigger protection signal detector 16–C detects a continuous duration $(T_5)$ of a signal of frequency $f_2$.

As a result of the above construction, if a normal control signal is received by the receiving side, only the switch 15 is switched-ON at a period $P_c$ in response to a continuous duration $T_1$ of the control signal having the frequency $f_1$. Accordingly, the receiver 12 is applied to the audio amplifier through the switched -ON switch 15. However, if a spurious signal $W_{f1}$ as shown in FIG. 10 is received at the monitoring device, a spurious trigger protection signal $W_{f2}$ is transmitted from the sending side to the receiving side in response to the false indication signal from the monitoring device. Since the switch 17 is switched-OFF at a period $P_o$ in response to the spurious trigger protection signal $W_{f2}$, erroneous detection caused by a false signal can be effectively eliminated.

Figure 12:
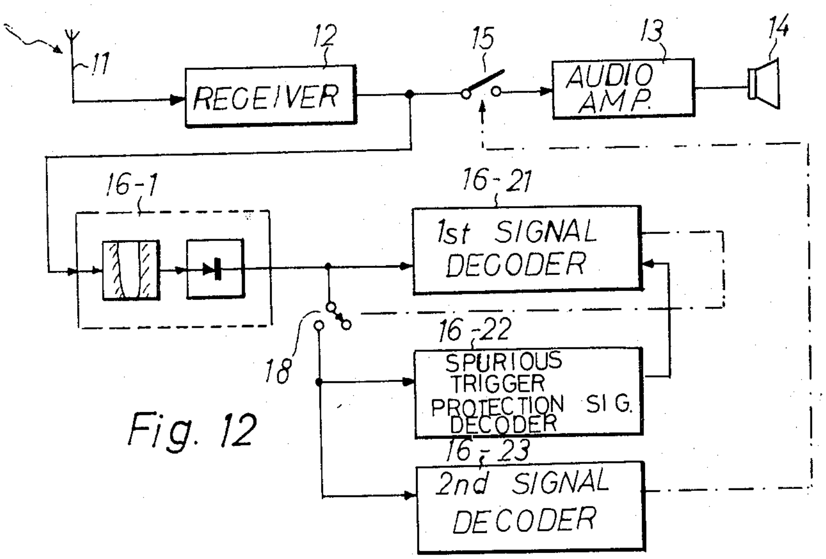
FIG. 12 is a circuit diagram illustrating an example of the receiving side of the system of this invention suitable for a signal configuration described with reference to FIGS. 11A to 11C.

The example shown in FIG. 9 may be also employed for the keying signal configuration and the coded signal configuration of the control signal mentioned in the above items (i) and (ii) if a spurious trigger protection signal having a frequency different from the frequency of the control signal is employed.

iv. Fourth type suitable for a control signal of sequence signal configuration formed by two sequence signals having the same frequency:

In this case, it is assumed that a control signal is formed as shown in FIG. 11A by a first signal I common for a plurality of control purposes and a second signal II delayed by a time p from the first signal I and employed for a particular one of the control purposes. A spurious signal protection signal of this case is transmitted as shown in FIG. 11C from a time L which is delayed by a time $t_1$ from the start of a false signal as shown in FIG. 11B. For receiving the control signal of this type, an example of the receiving side of this invention is shown in FIG. 12. In this example, a control signal detection circuit comprises a selecting-rectifier 16-1 for selecting the frequency components of the control signal and for rectifying the selected signal for producing a dc output, a first signal decoder 16-21 for producing a first control output by a relay in response to a duration $t_1$ of the first signal I included in the dc output from the selecting-rectifier 16-1, a switch 18 connected to the selecting-rectifier 16-1 and switched-ON in response to the first control output from the first signal decoder 16-21, a second signal decoder 16-23 connected to the switched output of the switch 18 for switching-ON the switch 15 in response to the second control signal, and a spurious trigger protection signal decoder 16-22 connected to the switched output of the switch 18 for releasing self holding of the relay in the first signal decoder 16-21 in response to a spurious trigger protection signal transmitted at the pause period *p*.

As a result of the above construction, if a normal control signal is received by the receiving side, the switch 18 is closed in response to detection of the first control signal by the first signal decoder 16-21, and the switch 15 is then closed in response to detection of the second control signal by the second signal decoder 16-23. However, if a false signal is detected by the monitoring device before the time L, a spurious trigger protection signal as shown in FIG. 11C is transmitted from the sending side to the receiving side. Accordingly, closed the switch 18 is opened in response to release of the relay of the first signal decoder 16-21 since the spurious trigger protection signal is detected by the decoder 16-22.

The first signal decoder 16-21 is designed so as to be suitable for signal configuration of the first control signal. If the signal configuration of the first control signal is as shown in FIG. 11A, the pulse counting circuit 16-2 shown in FIG. 4 is suitable. If the signal configuration of the first control signal is as shown in FIG. 11B, the measuring circuit 16-5 shown in FIG. 8 is suitable.

Figure 13:
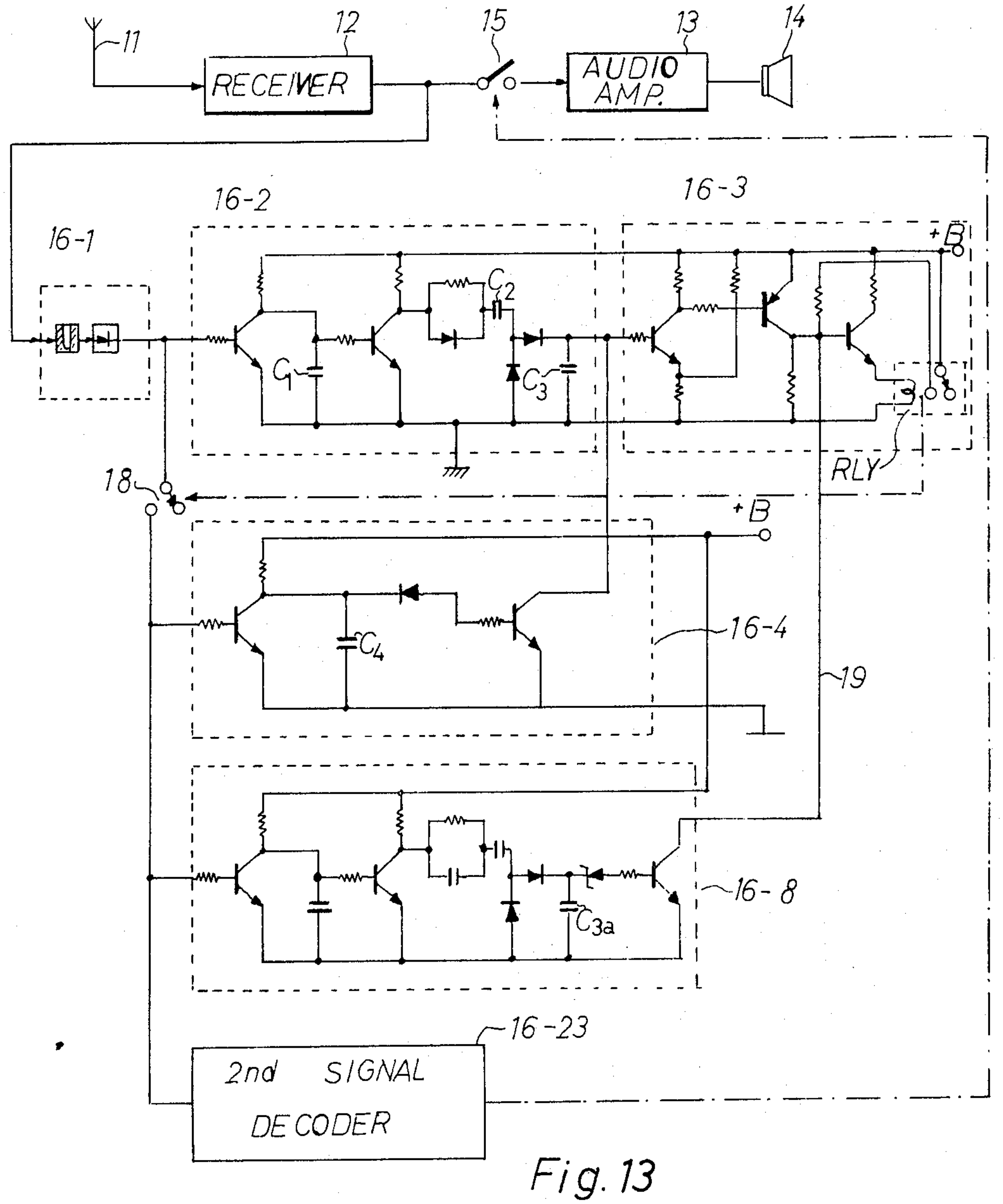
FIG. 13 is a circuit diagram including a block diagram illustrating an example of detailed constructions of the example shown in FIG. 12.

A more detailed example of the receiving side corresponding to the example shown in FIG. 12 is shown in FIG. 13. In this example, circuits 16-1, 16-2, 16-3 and 16-4 are the same as those shown in FIG. 4. A circuit 16-8 is provided for releasing a relay RLY in the circuit 16-3 in response to a predetermined number of pulses (e.g.; four) passing through the switched-ON switch 18.

As mentioned in the above items (i), (ii), (iii) and (iv), spurious trigger caused by a false signal can be effectively eliminated in accordance with this invention even if any type of control signals is employed. The spurious trigger protection operations are performed also in response to a false signal caused by a program signal transmitted from the sending side of the same broadcast system. Accordingly, if the program signal has many chances for causing the false signal, the spurious trigger protection signal will be frequently transmitted from the sending side. This is not desirable for comfortable receiving of the program signal for many receivers, whose receivers are already unmuted in their discretions for receiving the program signal.

Figure 14:
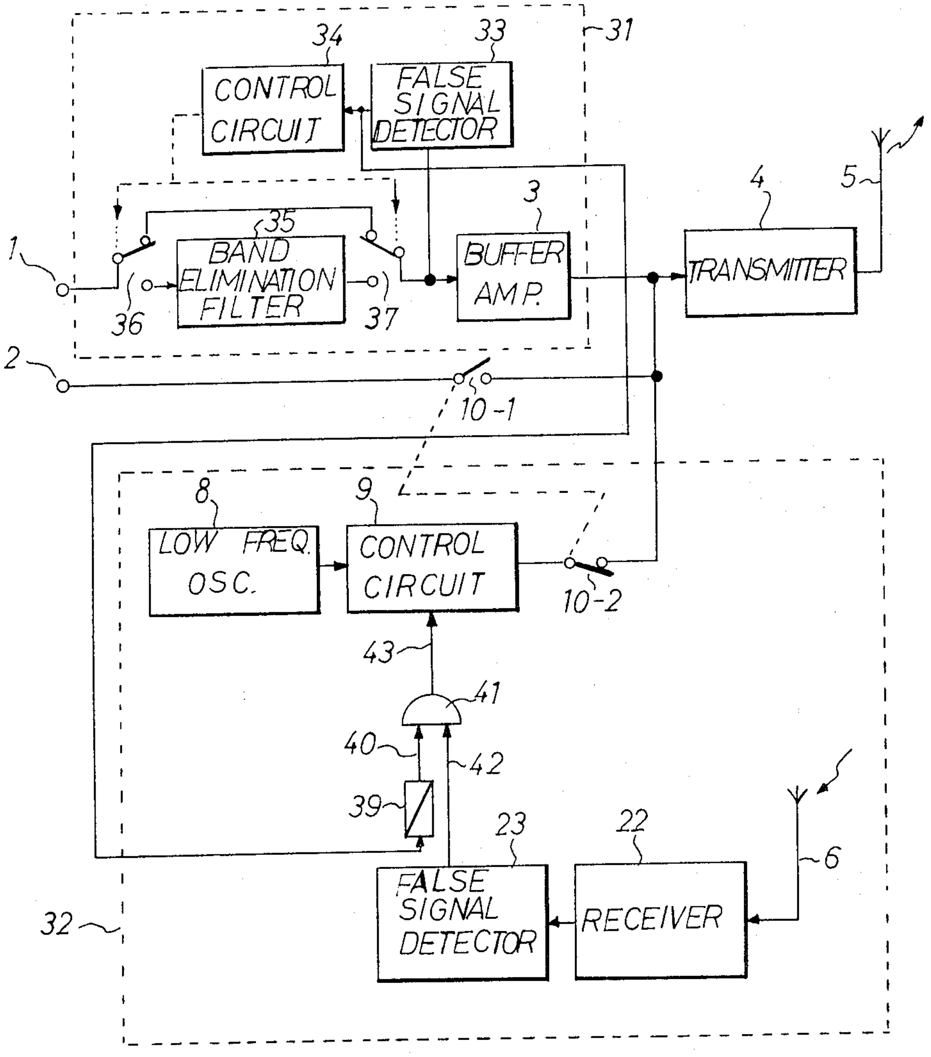
FIG. 14 is a block diagram illustrating another example of the sending side of the system of this invention.

For resolving the above mentioned problem, an example of the sending side of this broadcast system shown in FIG. 14 has the elimination function for a false signal caused by a program signal transmitted from the same sending side. In this example, the elimination function comprises, in addition to circuits shown in FIG. 2, a false signal detector 33 for detecting a false signal in the program signal, a control circuit 34 controlled by a detected output of the false signal detector 33, a band elimination filter 35 for eliminating the same frequency components of the control signal from the program signal, switches 36 and 37 for inserting the band elimination filter 35 into the path of the program signal under control of the control circuit 34. A false signal included in the program signal is completely eliminated by this circuit 31. Moreover, the output of the false signal detector 33 is applied to one input of an AND circuit 41 through a NOT circuit 39, while the output of the false signal detector 23 is applied to the other input of the AND circuit 41. The output 43 of the AND circuit 41 is applied to the control circuit 9. As a result of the above mentioned construction, a spurious trigger protection signal is applied to the transmitter 4 only when, at non-sending-out of a control signal, any false signal is not detected by the false signal detector 33 while a false signal is detected by the false signal detector 23. Accordingly, only spurious trigger caused by other broadcast systems or noise can be effectively eliminated by the example shown in FIG. 14.

What I claim is:

1. A broadcast system for a control signal under protection against spurious triggering caused by a false signal similar to the control signal, comprising:

sending means for sending out the control signal and a program signal in a transmission medium;

receiving means coupled to the transmission medium for receiving the program signal and the control signal, said receiving means provided with a control signal detector for detecting the control signal and a first switch for unmuting the receiving means so as to receive the program signal in response to detection of the control signal by the control signal detector;

monitoring means coupled to the transmission medium for detecting said false signal before spurious triggering of said control signal detector caused by the false signal and for generating a false indication signal in response to said detection of the false signal;

a second switch coupled to said sending means and only switched-OFF during a time when said control signal is transmitted;

control means coupled to said second switch for transmitting a spurious trigger protection signal from said sending means to said receiving means in response to said false indication signal for checking erroneous detection as the control signal by said control signal detector caused by said false signal; and means for applying the false indication signal to said control means.

2. A broadcast system according to claim 1, in which said false indication signal is directly applied to said control means.

3. A broadcast system according to claim 1, in which said false indication signal is applied to said control means through said transmission medium.

4. A broadcast system according to claim 1, in which said control signal has a keying signal configuration of regular intervals, and in which said spurious trigger protection signal has a continuous signal configuration.

5. A broadcast system according to claim 1, in which said control signal has a coded signal configuration including code elements of a state 0, and in which said spurious trigger protection signal has a continuous signal configuration.

6. A broadcast system according to claim 1, in which said receiving means further provided with a spurious trigger protection signal detector coupled with said control signal detector for detecting said spurious trigger protection signal for performing said checking of said erroneous detection against said control signal detector.

7. A broadcast system according to claim 6, in which said spurious trigger protection signal has a frequency other than a frequency of said control signal.

8. A broadcast system according to claim 6, in which said control signal is a sequence signal formed by a first control signal and a second control signal, and in which said control signal detector comprises a first signal detector for detecting said first control signal, a third switch coupled to the input of the first signal detector and switched-ON by the detected output of the first signal detector, and a second signal detector coupled to the third switch for detecting said second control signal for switching-ON said first switch.

9. A broadcast system according to claim 1, further comprising elimination means coupled to said sending side for eliminating said false signal included in said program signal in response to an output of a false signal detector coupled to a path of said program signal, and an AND gate whose inputs receive said false indication signal and a NOT result of said output of the false signal detector, the output of said AND GATE being applied to said control means.

* * * * *